United States Patent [19]
Adams

[11] Patent Number: 5,570,545
[45] Date of Patent: Nov. 5, 1996

[54] APPARATUS FOR HOLDING A ROOF ON A BUILDING DURING HIGH WINDS

[75] Inventor: James A. Adams, Honolulu, Hi.

[73] Assignee: Jerome G. Ganske, Honolulu, Hi.

[21] Appl. No.: 202,211

[22] Filed: Feb. 25, 1994

[51] Int. Cl.$^6$ ............................................... E04B 7/00
[52] U.S. Cl. ........................ 52/23; 52/2.25; 52/5; 248/237
[58] Field of Search .................................. 52/2.15, 2.25, 52/2.26, 23, DIG. 11, 4, 5; 248/237

[56] References Cited

U.S. PATENT DOCUMENTS

| | | | |
|---|---|---|---|
| 354,342 | 12/1886 | Pratt | 52/23 |
| 1,864,403 | 6/1932 | Bradley | 52/23 |
| 2,306,537 | 12/1942 | Hamm | 52/23 |
| 3,309,822 | 3/1967 | Dunkin | 52/23 |
| 3,548,904 | 12/1970 | Mackell | 52/2.15 |
| 3,846,943 | 11/1974 | Wagner | 52/23 |
| 3,886,961 | 6/1975 | Geiger et al. | 52/23 |
| 4,015,376 | 4/1977 | Gerhardt | 52/23 |

Primary Examiner—Carl D. Friedman
Assistant Examiner—Winnie Yip
Attorney, Agent, or Firm—Donald A. Streck

[57] ABSTRACT

In a building having a roof with multiple spaced rafters sitting on side walls, this is apparatus for holding the roof on the side walls both vertically and horizontally during high side wind forces. There are plurality of attachment fixtures carried by respective ones of opposite ends of adjacent rafters along a length of the roof. A plurality of ground anchors are disposed at respective ones of ends of the rafters opposite the opposite ends carrying the plurality of attachment fixtures. Finally, a plurality of straps are connected between respective ones of the plurality of attachment fixtures and the plurality of ground anchors. The straps are releasably attached so that they can be stored and only be attached when a hurricane or the like is likely. The attachment fixtures distribute forces to the whole rafter end and avoid rafter-splitting forces.

5 Claims, 5 Drawing Sheets

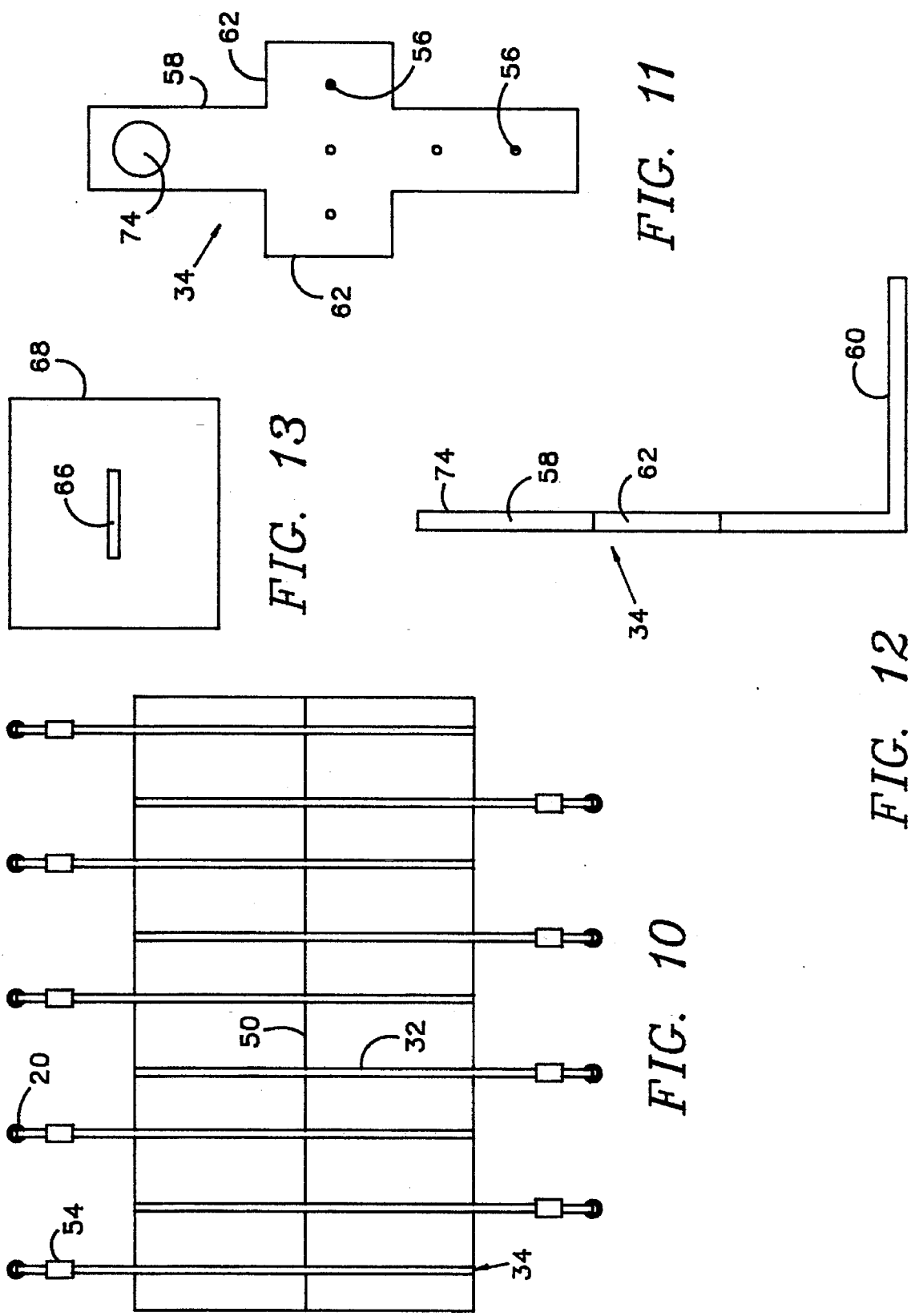

5,570,545

APPARATUS FOR HOLDING A ROOF ON A BUILDING DURING HIGH WINDS

BACKGROUND OF THE INVENTION

1. Technical Field

This invention relates to methods and apparatus for tying down buildings against the destructive wind force of hurricanes and the like and, more particularly, in a building having a roof with multiple spaced rafters sitting on side walls, to apparatus for holding the roof on the side walls both vertically and horizontally during high side wind forces comprising, a plurality of roof anchors carried by respective ones of opposite ends of adjacent rafters along a length of the roof; a plurality of ground anchors disposed at respective ones of ends of the rafters opposite the opposite ends carrying the plurality of roof anchors; and, a plurality of straps connected between respective ones of the plurality of roof anchors and the plurality of ground anchors.

2. Background Art

Property loss from hurricanes can be substantial as the residents of Florida and Hawaii found out recently. Unless homes are constructed in a way to resist the forces created on and in them by hurricane force winds as depicted in FIG. 1, they can be completely destroyed. Roofs are lifted completely off as depicted in FIG. 2 and/or walls are flattened to the ground as depicted in FIG. 3. Unfortunately, very few homes and similar buildings in existence in hurricane vulnerable areas are built with adequate provision for resisting such forces.

Stand-alone devices such as airplanes and mobile homes have used tie-down systems against gale force winds for a long time. Because of their manner of construction, straps passing over them and fastened to ground anchors typically work adequately for the purpose. Trying to adapt these prior tie-down systems to homes and similar buildings doesn't work because of the difference in construction. As depicted in FIG. 4, a house 10 has walls 12 and a roof 14. Typically, the roof 14 is of a generally unitary construction having a plurality of rafters joined by roof sheathing covered by some sort of a water-resistive covering such as shingles. The roof simply sits on the top edges of the walls 12 and is held in place mostly by gravity and some nails "toe-nailed" in place. In some cases, small metal clips are employed in lieu of the toe-nails. To provide hurricane protection, the roof rafters are bolted to the walls at their point of contact using steel plates and straps. The problem to be described with respect to FIGS. 4 and 5 can even occur with the bolting process, however, for reasons which will become apparent.

As depicted in FIG. 4, one prior art method of attempting hurricane protection is to use strap or cable tie-downs 16 connected from the ends 18 of the rafters to a ground anchor 20. When subjected to the hurricane force winds 22 of FIG. 1, two types of forces are created in the house 10. First, there is a lifting force 24 on the roof 14 created by the winds 22 passing over the roof, which acts as an airfoil. For the same reason a 747's wings lift it into the air, the roof 14 wants to lift the house 10. Second, because the ends 18 of the rafters are connected to the ground anchors 20, there is a force 26 tending to pull the roof 14 apart at its ridge line 28. As a result, the roof 14 can pull apart and lift off as depicted in FIG. 5. Once the roof 14 is gone, the walls 12 can be blown down as in FIG. 3.

Using the continuous strap approach of mobile homes and airplanes as depicted in FIG. 6 where a plurality of straps 30 pass over the roof 14 between ground anchors 20 doesn't work because of the manner of construction of a house. What happens is depicted in FIG. 7. While it is true that the straps 30 prevent the roof 14 from being blown off, they don't prevent the walls 12 from being blown over. The roof 14 simply slides sideways within the straps 30 as the walls 12 go over. At the very least, the house 10 remains as in FIG. 7 and is rendered uninhabitable. At worst, the roof 14 ends up sitting on a pile of rubble that was once the walls 12.

Wherefore, it is an object of this invention to provide a home or other building of similar construction with a way of successfully resisting hurricane force winds.

It is another object of this invention to provide a home or other building of similar construction with a way of successfully resisting hurricane force winds which can be deployed only when there is a danger imminent.

It is still another object of this invention to provide a home or other building of similar construction with a way of successfully resisting hurricane force winds which can be deployed quickly and easily when there is a danger imminent.

It is yet another object of this invention to provide a home or other building of similar construction with a way of successfully resisting hurricane force winds which creates compressive forces within the structure and resists sideward sliding forces on the structure.

Other objects and benefits of this invention will become apparent from the description which follows hereinafter when read in conjunction with the drawing figures which accompany it.

SUMMARY OF THE DISCLOSURE

The foregoing objects have been achieved in a building having a roof with multiple spaced rafters sitting on side walls, by the apparatus of the present invention for holding the roof on the side walls both vertically and horizontally during high side wind forces comprising a plurality of roof anchors carried by respective ones of opposite ends of adjacent rafters along a length of the roof; a plurality of ground anchors disposed at respective ones of ends of the rafters opposite the opposite ends carrying the plurality of roof anchors; and, a plurality of straps connected between respective ones of the plurality of roof anchors and the plurality of ground anchors.

In the preferred embodiment, there are a plurality of tensioning means disposed in each one of the plurality of straps.

Additionally in the preferred embodiment, the plurality of straps is releasably carried by the plurality of roof anchors and the plurality of ground anchors.

Also in the preferred embodiment, each of the plurality of roof anchors is an L-shaped metal piece having a vertical portion with a plurality of nail holes therethrough and an attachment hole therethrough at a top end above a roof top surface and a horizontal portion extending under a bottom edge of an associated rafter.

Each preferred roof anchor also includes a flashing plate having a slot therethrough through which the vertical portion passes.

BRIEF DESCRIPTION OF THE DRAWINGS

FIG. 10 is a plan view drawing of the roof of a building being held down and protected by the present invention.

FIG. 11 is a front view drawing of a roof anchor employed in the present invention in a first embodiment.

FIG. 12 is a side view drawing of the roof anchor of FIG. 11.

FIG. 13 is a plan view of a flashing piece that can be used with the roof anchors of the present invention in any embodiment thereof.

DETAILED DESCRIPTION OF THE PREFERRED EMBODIMENT

Figure 8:
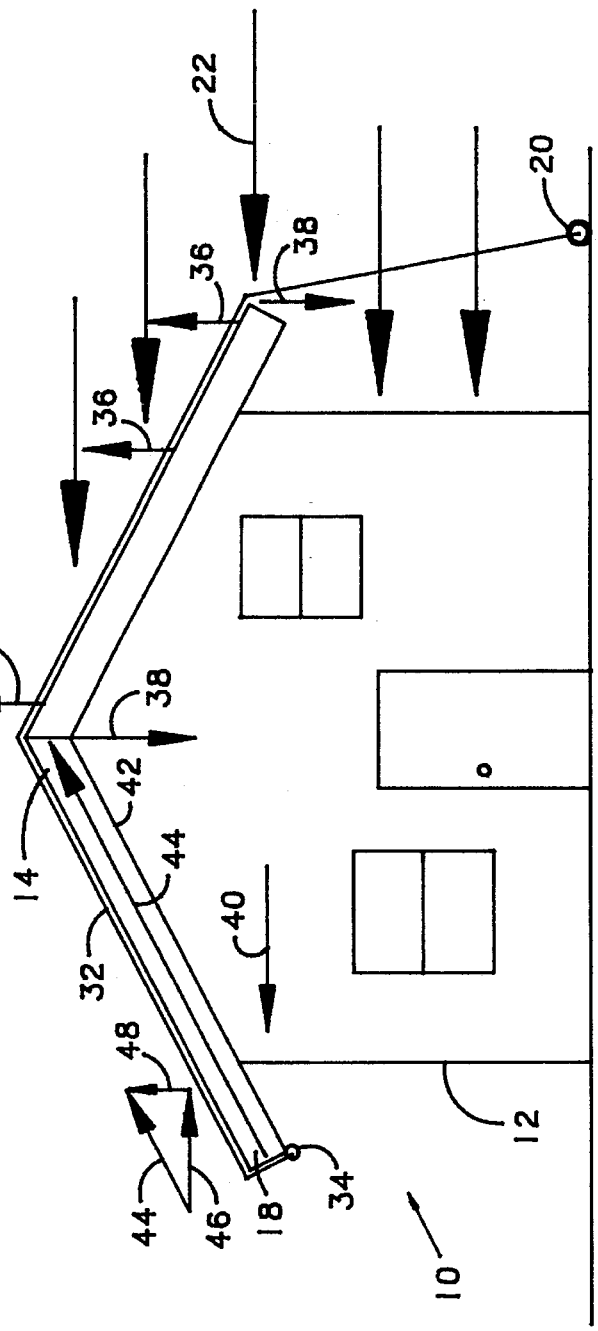
FIG. 8 is an enlarged drawing of a building being held down according to the present invention depicting one strap and the various forces and counter forces created.

The principle upon which the present invention is founded is shown in FIG. 8. Only one strap 32 is shown for purposes of force vector analysis; however, it will be seen that a plurality of straps are actually employed and that the straps alternate sides.

Figure 1:
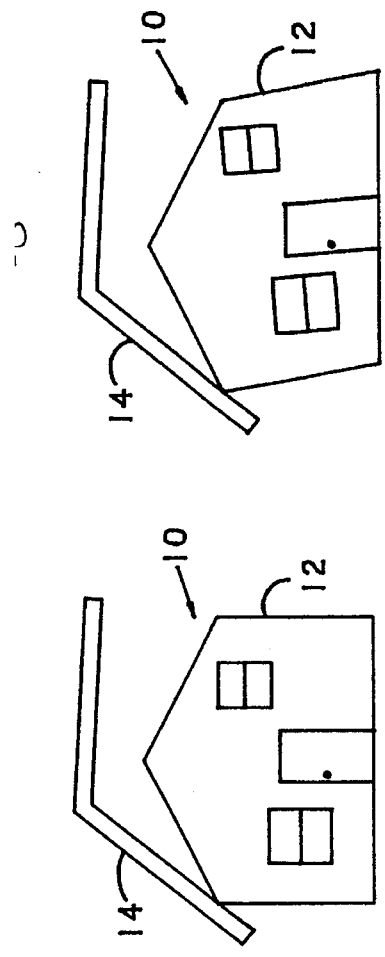
FIG. 1 is a simplified drawing showing hurricane wind forces striking a prior art building without any tie-down provision.
Figure 2:
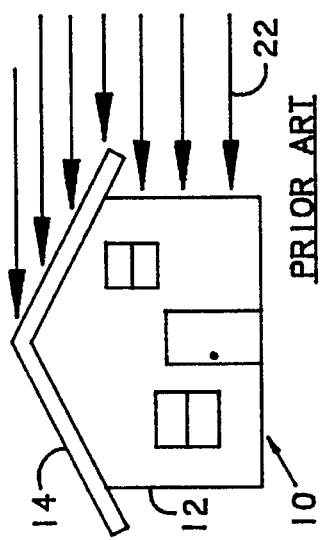
FIG. 2 is a simplified drawing depicting one possible result to the building of FIG. 1.
Figure 3:
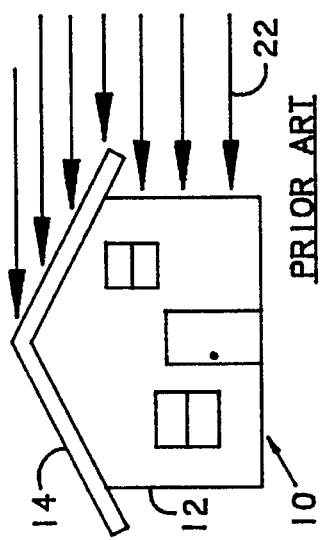
FIG. 3 is a simplified drawing depicting another possible result to the building of FIG. 1.
Figure 5:
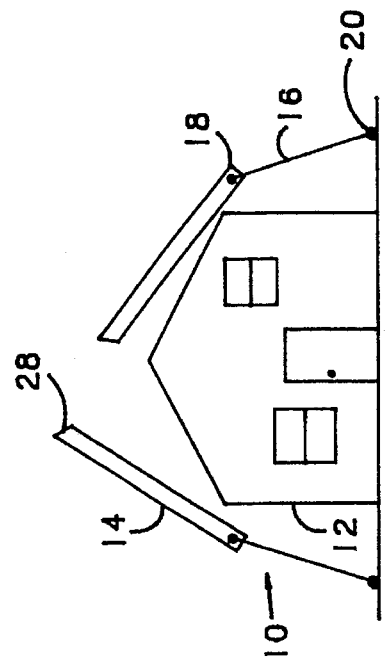
FIG. 5 is a simplified drawing depicting a possible result to the building of FIG. 4.
Figure 4:
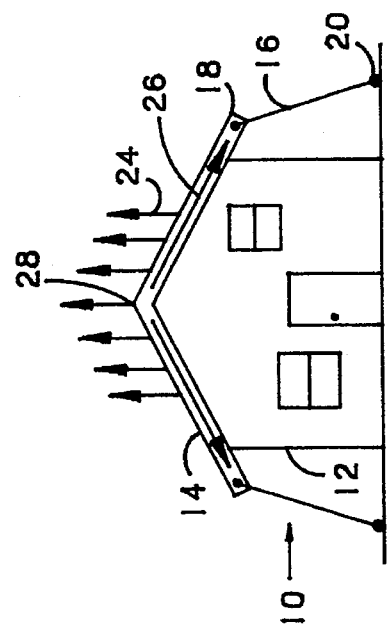
FIG. 4 is a simplified drawing showing a building with a first prior art tie-down provision and depicting the forces created thereon and therein by hurricane wind forces.
Figure 6:
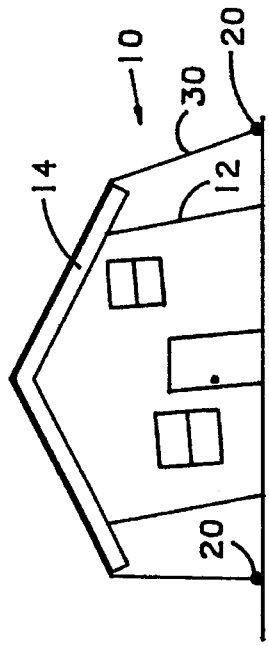
FIG. 6 is a simplified drawing showing a building with a second prior art tie-down provision.
Figure 7:
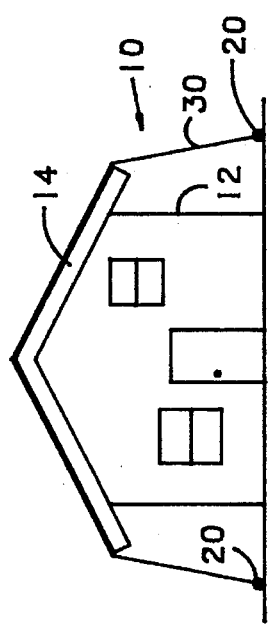
FIG. 7 is a simplified drawing depicting a possible result to the building of FIG. 6.

Each strap 32 stretches from a roof anchor 34 at a rafter end 18 over the roof 14 to a ground anchor 20 on the opposite side of the house 10. This has a unique result as depicted in the force vectors in FIG. 8. As the hurricane winds 22 blow, upward forces 36 are created tending to lift the roof 14. The strap 32, however, produces downward forces 38 counteracting the upward forces 36 thereby holding the roof 14 down. Similarly, the horizontal force 40 tending to slide the roof 14 and topple the walls 12 as in FIG. 7 is counteracted by the strap 32 and its resistive force into the rafter 42. The strap 32 creates a longitudinal compressive force 44 in the rafter 42. Since the compressive force 44 is angular, it has a horizontal and vertical component. It is the horizontal component 46 which counteracts the horizontal force 40. The vertical component 48 is small and offset by various forces and structural attachments including for the most part the weight of the roof 14 itself. Thus, all the destructive forces caused by the hurricane winds 22 are effectively counteracted.

Figure 9:
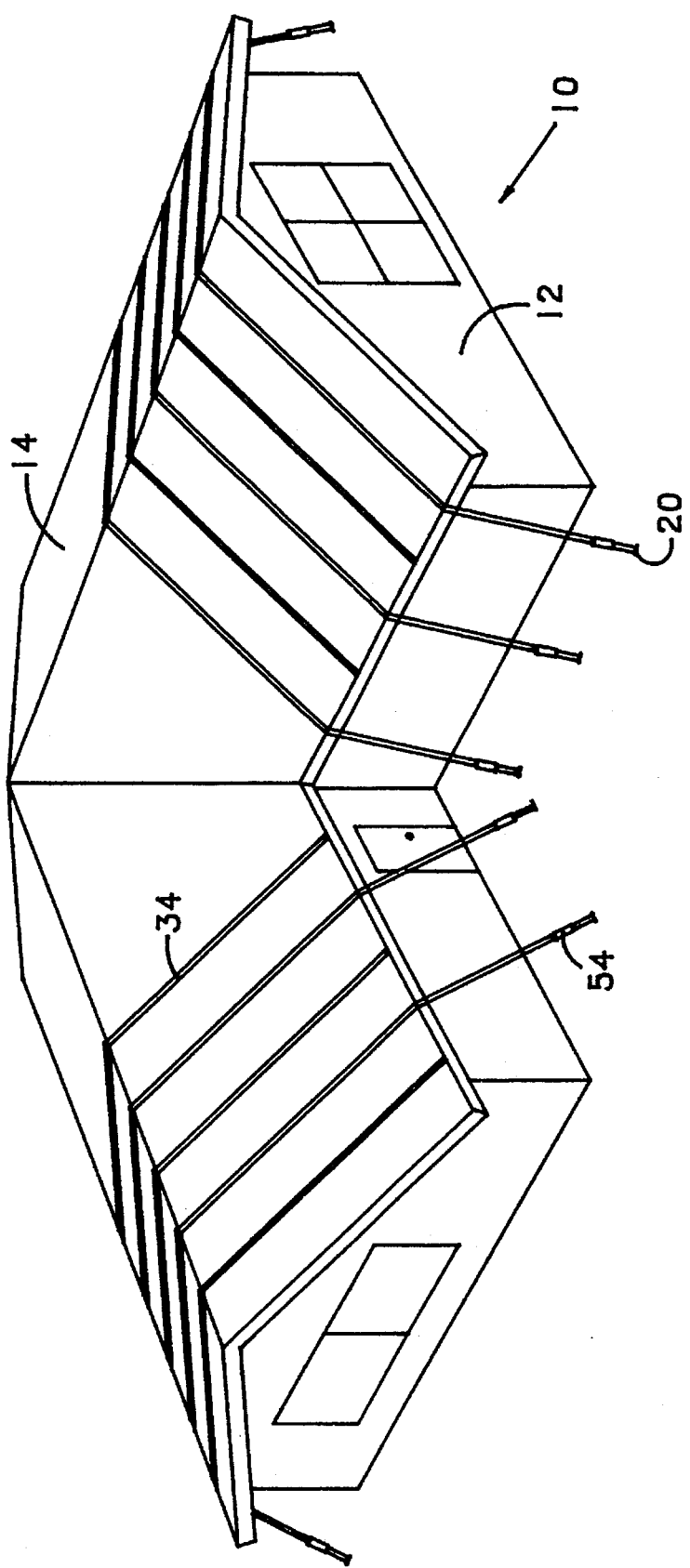
FIG. 9 is a perspective drawing of a building being held down and protected by the present invention.

As shown in FIGS. 9 and 10, in the preferred installation, the straps 32 extend along the length of the roof 14 at spaced intervals perpendicular to the ridge line 50 of the roof. That makes the straps parallel to the rafters 42 to which they connect. For maximum protection, each rafter 42 is connected to a strap 32. As can be seen, each strap 32 is connected to the opposite side of the roof 14 from the next adjacent straps 32.

While one could install the system of the present invention on a permanent basis, to do so would not be very desirable. For one thing, it would not be esthetically pleasing and people could trip over the ground anchors 20 and straps 32. The preferred straps 32 (as opposed to cables or the like) could also be adversely effected by the UV rays of the sun such that the straps 32 might fail when actually subjected to high force loads. Thus, it is preferred that the ground anchors 20 be deployed and that the roof anchors 34 be installed in advance and that the straps 32 only be connected when and if a hurricane danger appears. As will be seen, with the present invention this can be done quickly and easily with a minimum of space being required for material storage.

Most of the components of the present system can be standard off-the-shelf components. The ground anchors 20 are most easily implemented using auger type anchors which are "screwed" into the ground. Anchors set into concrete could, of course, be employed if desired. Fabric straps for the straps 32 are preferred for several reasons. Fabrics such as Kevlar are strong, lightweight, and have minimum stretch. Cable, by comparison, is heavy, tends to kink (permanently) and has a high degree of stretch. The stretch factor is a major consideration. The straps 32 when installed must be placed under tension. A standard strap tensioner 54 can be placed in-line with each strap 32 and accomplish the desired tensioning with ease. The fabric straps simply roll back up for storage. Moreover, the straps conform to the surface and spread pressure over the strap's width at points of bending. By comparison, a cable puts point pressures at points of bending and the bending can cause kinks in the cable. A cable must be coiled for storage (as opposed to rolling) and any bends or kinks can make the cable difficult to coil flat and make storage a nightmare.

Figure 15:
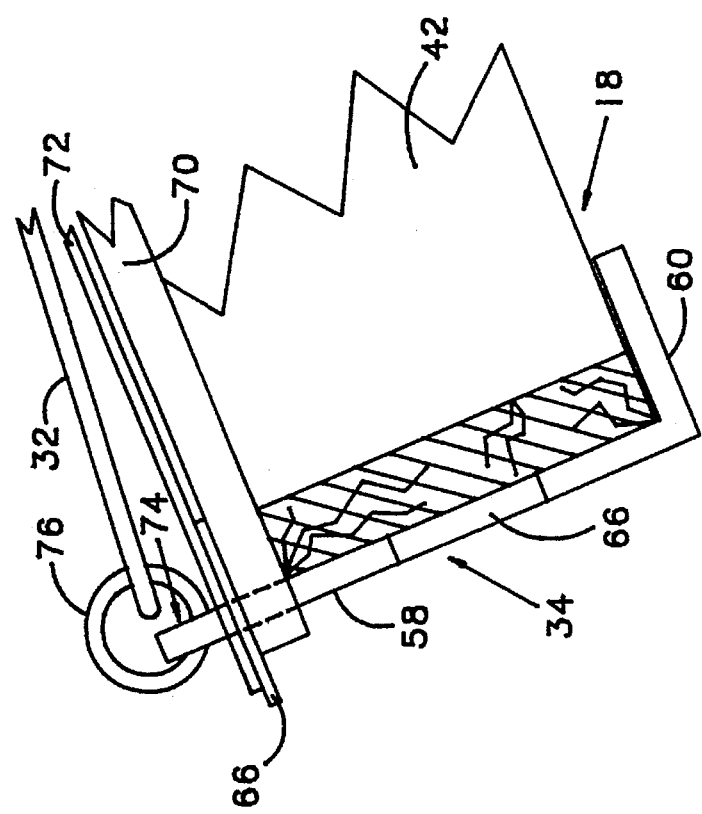
FIG. 15 is a side view of a roof rafter end with a facie board attached thereto and with the roof anchor of FIGS. 11 and 12 positioned for attachment thereto.
Figure 14:
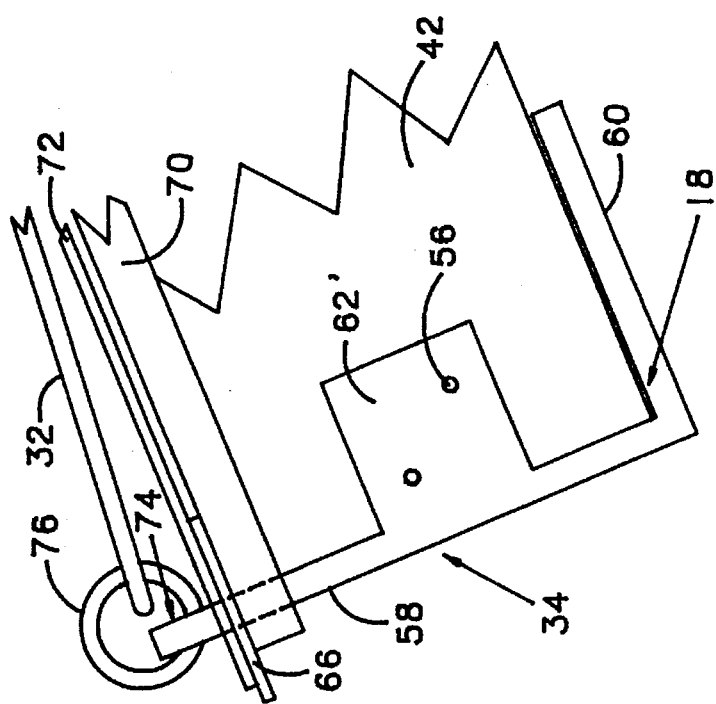
FIG. 14 is a side view of a roof rafter end with a roof anchor employed in the present invention in a second embodiment positioned for attachment thereto.

A unique component in the present invention is the roof anchor 34. The roof anchor 34 is shown in one embodiment in FIGS. 11, 12, and 15 and in another embodiment in FIG. 14. The roof anchor 34 is easily made by stamping from heavy gauge steel or the like. Subsequent galvanizing would, of course, be desirable to retard rusting in the tropical climates where hurricanes prevail. As depicted in FIG. 12 with particularity, the roof anchor 34 has a plurality of holes 56 therethrough through which nails can be driven to attach the roof anchor 34 to the rafters 42 and adjoining structural components such as facie boards. The roof anchors 34 are L-shaped and comprise a vertical portion 58 and a horizontal portion 60. In the embodiment of FIGS. 11, 12, and 15, the vertical portion 58 has ears 62 extending sideways therefrom in the same plane as the vertical portion 58 with nail holes 56 therethrough. This provides a greater attachment area when the roof anchors 34 are attached to a facie board 64 at each rafter end 18 as depicted in FIG. 15. In the embodiment of FIG. 14, the ears 62' are bent 90° to extend backwards in the direction of the horizontal portion 60. The internal distance between the ears 62' is that of a rafter's thickness so that the ears 62' can be nailed to the rafter's sides. Note that in both embodiments, the horizontal portion extends along the underside of the rafter's end 18 so that any lifting forces on the roof anchor 34 are applied directly to the rafter and not to any surrounding components or as a splitting force in the rafter 42.

In the preferred roof anchor 34, a metal flashing plate 66 as depicted in FIG. 13 is also employed. The flashing plate 66 has a slot 68 therein sized to slip over the vertical portion 58 of the roof anchor 34 prior to its positioning for nailing. As depicted in FIGS. 14 and 15 which depict the roof anchor 34 positioned to be nailed in place, the roof sheathing 70 and the roofing material 72 are notched or slotted to allow the vertical portion 58 to pass through and expose the attachment hole 74 in its top end. The flashing plate 66 is positioned on top of the roof sheathing 70 and under the roofing material 72. After nailing, the straps 32 can be attached to the attachment holes 74 with any kind of convenient releasable fastener 76 designed to take the forces involved.

Wherefore, having thus described the present invention, what is claimed is:

1. Apparatus to hold down a building roof including multiple spaced rafters sitting along a length of the roof on side walls supported by surrounding Earth both vertically and horizontally during high side wind forces comprising:
    a) a plurality of roof anchors alternatively attached to opposite ends of adjacent rafters along the length of the roof on two sides of the building;
    b) a plurality of ground anchors fastened into the Earth below ends of the rafters opposite said opposite ends attached to said plurality of roof anchors; and,
    c) a plurality of straps, each connected between a one of said roof anchors crossing over the roof to a one of said ground anchors associated with a common one of said rafters.

2. The apparatus of claim 1 and additionally comprising:
    a plurality of tensioning means disposed in each one of said plurality of straps.

3. The apparatus of claim 1 wherein:
    said plurality of straps is releasably attached to said plurality of roof anchors and said plurality of ground anchors.

4. The apparatus of claim 1 wherein each of said plurality of roof anchors is an L-shaped metal piece having:
    a) a vertical portion with a plurality of nail holes therethrough and an attachment hole therethrough at a top end located above a top surface of the roof; and,
    b) a horizontal portion extending under a bottom edge of an associated rafter.

5. The apparatus of claim 4 and additionally comprising:
    a flashing plate having a slot therethrough through which said vertical portion passes.

* * * * *